Patented Nov. 10, 1936

2,060,021

UNITED STATES PATENT OFFICE 2,060,021

ALBUMINOUS SOLUTIONS WHICH DO NOT FORM FLAKES

Max Bockmühl, Frankfort-on-the-Main, Erich Simons, Hofheim-on-the-Taunus, and Eugen Dörzbach, Frankfort-on-the-Main, Germany, assignors to Winthrop Chemical Company, Inc., New York, N. Y., a corporation of New York No Drawing. Application July 6, 1934, Serial No. 734,032. In Germany July 8, 1933

3 Claims. (Cl. 167—76)

The present invention relates to albuminous solutions which do not form flakes.

Solutions containing albumen do not remain permanently clear, but tend to form flakes, owing to the denaturation of the albumen. This drawback is experienced, particularly in therapeutic preparations.

Now we have found that the flocculation of solutions of albuminous medicaments may be overcome or largely prevented by adding to the albuminous solutions high molecular albumen degradation products, especially acids, such as protalbinic acid, lysalbinic acid, etc. Especially the salts of these albumen degradation products, particularly the alkali metal salts, as for instance, the sodium salts and potassium salts, are adapted for the present process. It is advisable to add the degradation product to the albuminous solution ready for use. With the same success the substances preventing the flocculation may also be added to the albuminous solution at any stage of the manufacturing process.

As medicaments containing albumen there may, for instance, be named the secretion products of the thyroid gland, as high molecular degradation products there may be used products which are split off during an alkaline degradation of the albumen, furthermore peptones, obtained by an enzymatic degradation, for instance, by the degradation by means of pepsine.

The following examples illustrate the invention, but they are not intended to limit it thereto:

1. A 1 per cent. solution of thyreoglobuline is mixed, while stirring with about 1 per cent. of the sodium salt of protalbinic acid, after a sterilizing agent has been added. After the filtration the solution no longer shows formation of flakes.

2. A fractionated solution of thyreoglobuline is adjusted to the desired concentration and mixed with such a quantity of the sodium salt of protalbinic acid that the solution contains about 1°/00 of the sodium salt of protalbinic acid. The solution is sterilized with tricresol and filtered through a Seitz-filter.

We claim:

1. Aqueous solutions comprising a therapeutically active secretion product of the thyroid gland and a substance of the group consisting of albuminic acids and their alkali metal salts.

2. Aqueous solutions comprising a therapeutically active secretion product of the thyroid gland and an alkali metal salt of an albuminic acid.

3. Aqueous solutions comprising thyreoglobuline and the sodium salt of protalbinic acid.

MAX BOCKMÜHL.
ERICH SIMONS
EUGEN DÖRZBACH.